United States Patent Office 3,057,711
Patented Oct. 9, 1962

3,057,711
STABILIZATION OF PHOSPHORIC ACID AND
NEUTRALIZED SOLUTIONS THEREOF
Robert E. Reusser and Joseph F. Wilson, Bartlesville,
Okla., assignors to Phillips Petroleum Company, a corporation of Delaware
No Drawing. Filed July 7, 1958, Ser. No. 746,644
17 Claims. (Cl. 71—43)

This invention relates to the stabilization of wet process phorphoric acid, and neutralized solutions thereof. More particularly, it relates to a method for inhibiting the formation of solids in phosphoric acid produced according to the so-called "wet process" by acidulating phosphate rock or other phosphatic material with an acid.

Many processes have been suggested, patented, or employed in the past for the manufacture of phosphoric acid. The so-called "wet process" for producing phosphoric acid has been extensively used because of its simplicity and economic operation. According to this process, phosphate rock is treated in a series of reactors with concentrated sulfuric acid to produce a slurry of soluble phosphoric acid and insoluble calcium sulfate (gypsum). The slurry is filtered and the resulting dilute phosphoric acid filtrate may then be concentrated for the production of triple superphosphate or other phosphatic fertilizer material. The dilute acid can be transferred to storage tanks where small but significant amounts of precipitated solid impurities settle in the storage tanks and cause handling problems.

The dilute acid can be concentrated and pumped to storage tanks where during storage appreciable amounts of impurities precipitate in solid form. When the concentrated acid is used for the production of triple superphosphate, it is pumped to a mixer and reacted with phosphate rock. The presence of the settled solids causes difficulty in handling the acid due to the fact that these solids tend to plug the lines, valves, and acid spraying nozzles in the mixer and often result in the shutting down of the triple superphosphate plant in order to clean the nozzles and other plugged equipment.

If the concentrated acid is to be employed for other purposes, generally it is pumped to unagitated storage tanks where the solids formed from the impurities are allowed to settle. Clarified acid is drawn off the tops of these tanks and the acid in the slurries in the bottoms of these tanks must be recovered by some means to maintain plant efficiency. During the settling period expensive tankage is tied up and the tanks must be cleaned out periodically. While this method of clarifying the acid is generally suitable, additionally formed solids slowly continue to settle out in the clarified acid and present further handling difficulties.

The impurities inherently present in phosphoric acid made according to the wet process comprise mainly polyvalent metal cations of dissolved salts of iron, aluminum and calcium, as established by analysis. In addition, lesser amounts of other impurities are generally present, including fluorides, fluorosilicates and dissolved salts of silicon, magnesium, copper, sodium, zinc, chromium, uranium, and vanadium. These impurities precipitate and settle out as solids or sludge at a slow rate occurring over an interval of several days and even weeks. The amount of total solids which settle out varies, generally from 0.5 to 10 percent by weight of acid and their composition varies during aging of the acid.

Where wet-process phosphoric acid is neutralized with ammonia or ammonical nitrogen-containing solutions to provide liquid fertilizer solutions or the like, the normally incident impurities, principally iron and aluminum, tend to precipitate or flocculate and settle. Although these precipitates can be removed by filtration, decantation, etc., the removal of these solid precipitates in this manner results in a prohibitive loss of valuable $P_2O_5$ which comes down with the precipitates.

Accordingly, an object of this invention is to stabilize wet-process phosphoric acid. Another object is to stabilize neutralized solutions of wet-process phosphoric acid. Another object is to provide a method for inhibiting in a novel and economical manner the precipitation of normally incident impurities present in phosphoric acid produced according to the so-called wet process, for example, by the acidulation of apatite phosphate rock. Another object is to provide a method of inhibiting the precipitation of impurities inherently or normally incident in phosphoric acid, principally the polyvalent metal cations from dissolved salts of iron and aluminum. A further object is to provide a method whereby the purification and handling of phosphoric acid, and its neutralized solutions, can be simplified by stabilizing these liquids with condensed phosphates or molecularly dehydrated phosphates so as to render them substantially solids free over a relatively long period of time and thereby prevent plugging of pipes, valves, nozzles, and the like. Other objects and advantages of this invention will become apparent to those skilled in the art from the discussion and appended claims.

Broadly contemplated, we propose by the practice of this invention to suppress or inhibit the formation of solid precipitates of normally incident impurities, mainly polyvalent metal cations, in wet-process phosphoric acid, or neutralized solutions thereof, by adding to said acid or solution a small but effective amount of a material which contains, or will provide upon disassociation, condensed phosphate anions, such as metaphosphate and polyphosphate anions.

Particularly useful inhibiting materials for this purpose are phosphorus pentoxide ($P_2O_5$), phosphorous pentachloride ($PCl_5$), condensed phosphoric acids, and ammonium and alkali metal salts of these acids. These inhibiting materials are preferably added just prior to the neutralization of the phosphoric acid, although they may be added during neutralization or shortly thereafter.

The phosphoric acid treated according to the practice of this invention can have an acid content expressed as $P_2O_5$ in the range between about 5 and 75 percent, preferably between about 30 and 60 percent. This treatment substantially inhibits the formation of solid precipitates of normally incident impurities, such as dissolved salts of calcium, iron and aluminum, thereby substantially alleviating problems of purifying and handling phosphoric acid and partially or completely neutralized solutions thereof.

Representative condensed phosphoric acids, useful in the practice of this invention, include the metaphosphoric acids having the general formula $(HPO_3)_n$, where $n$ is an integer generally in the range of 2 to 100 or even higher, such as dimetaphosphoric acid, $H_2P_2O_6$, trimetaphosphoric acid, $H_3P_3O_9$, tetrametaphosphoric acid, $H_4P_4O_{12}$, hexametaphosphoric acid, $H_6P_6O_{18}$, etc.; the polyphosphoric acids having the general formula

$$H_{n+2}P_nO_{3n+1}$$

where $n$ is an integer generally in the range of 2 to 100 or higher, such as pyrophosphoric acid, $H_4P_2O_7$, triphosphoric acid, $H_5P_3O_{10}$, tetraphosphoric acid, $H_6P_4O_{13}$, etc., and mixtures thereof. These acids are conveniently prepared by molecularly condensing or dehydrating orthophosphoric acid, $H_3PO_4$. These acids can be added as such to the wet-process acid or they can be generated in situ by adding phosphorus pentoxide, $P_2O_5$, or phosphorus pentachloride, $PCl_5$, to the wet-process acid.

Representative ammonium and alkali metal salts of condensed phosphoric acids, useful in the practice of this invention, include ammonium pyrophosphate, $(NH_4)_4P_2O_7$, diammonium hydrogen pyrophosphate, $(NH_4)_2H_2P_2O_7$, ammonium tetrametaphosphate, $(NH_4)_4P_4O_{12}$, tetrasodium pyrophosphate, $Na_4P_2O_7$, hexametasodium phosphate, $Na_6P_6O_{18}$, sodium acid pyrophosphate, $Na_2H_2P_2O_7$, sodium tripolyphosphate, $Na_5P_3O_{10}$, potassium tetrametaphosphate, $K_4P_4O_{12}$, lithium trimetaphosphate, $Li_3P_3O_9$, etc.; and mixtures thereof.

It should be recognized that the condensed phosphate anions, such as metaphosphate and polyphosphate anions, can revert to the orthophosphate anion under certain conditions and we have discovered that the stabilizing treatment of wet-process phosphoric acid of this invention can be carried out in such a manner as to minimize or prevent this reversion. The rate of reversion in aqueous or dilute phosphoric acid is a direct function of temperature and an inverse function of pH. In phosphoric acid solutions having a pH less than about 3, the reversion will be completed in a few minutes at temperatures above about 95° C. In less acid solutions, e.g., having a pH about 5 or higher, reversion is nil and the metaphosphate and polyphosphate anions are extremely stable. Where the wet-process phosphoric acid is neutralized with ammonia, ammonium hydroxide, or other alkali, reversion of the precipitate inhibiting anions is nil. Because of rapid reversion at high temperatures and low pH, the precipitate-inhibiting agents of this invention preferably should not be stored in acid solution for periods longer than about 24 hours, more preferably less than about 10 hours. Therefore, in order to minimize the reversion of the metaphosphate and polyphosphate anions, the crude wet-process phosphoric acid should preferably e.q. have a pH above about 3 and should be treated with the precipitate-inhibiting agent just prior to neutralization when it it desired to produce a liquid fertilizer solution, such as ammonium phosphate.

The amount of inhibiting material to be employed in the process of this invention will be dependent upon several factors, such as the amount of impurities present in the phosphoric acid or neutralized solution thereof, the age of these liquids, the particular inhibiting agent employed, the prior or subsequent treatment of the acid or neutralized solution, the use of these liquids, etc. Accordingly, we prefer to define the limits of amount of inhibiting material to be used in stabilizing the phosphoric acid or neutralized solution by functional rather than by actual numerical limits, the amount to be used being an amount sufficient to substantially inhibit the formation of solid impurities during storage or use of the treated liquid. Those skilled in the art will be able to determine the particular amounts to be used by simple routine tests. Generally, the amount of condensed phosphoric acid, or the ammonium or alkali metal salt thereof, etc., expressed in parts $P_2O_5$, to be employed in the practice of this invention will be a minor amount and commonly fall in the range between about 1 and 20 parts by weight per 100 parts by weight of the wet-process acid or neutralized solution thereof. However, higher or lower amounts can be employed if desired.

The treatment of the wet-process phosphoric acid or neutralized fertilizer solution for the practice of this invention can be assomplished in numerous ways with beneficial results. One particularly useful and preferred method of treatment involves removing a side stream of the crude phosphoric acid and heating this side stream at a temperature between about 200 and 300° C., for example, about 265° C. for two hours. The heating of this side stream in this manner results in the molecular condensation or dehydration of the crude orthophosphoric acid and the production of a condensed phosphoric acid. The side stream is then returned to the crude acid and mixed with the main stream thereof. The stabilized crude phosphoric main stream, now containing the condensed phosphoric acid, can be neutralized in any suitable manner with ammonia, ammonium hydroxide, and ammoniacal nitrogen-containing solutions to provide liquid fertilizer solutions or the like. The nitrogen and phosphorus-containing liquid fertilizer solution which results upon neutralization can then be treated with other plant nutrients such as potassium salts, urea, and the like. Alternatively, the heated side stream of crude phosphoric acid can be neutralized with ammonia to a pH of about 5 or higher. The resulting ammonium salt of the condensed phosphoric acid can then be stored and added to the crude phosphoric acid when desired.

A particularly useful inhibiting material is pyrophosphoric acid which need not be in a highly purified state. This condensed phosphoric acid can be obtained as a byproduct from various manufacturing processes, such as from the manufacture of acrylic acid, polyacrylates or related products, the pyrophosphoric acid byproduct often being a viscous, tarry appearing mass which sets to a semisolid paste upon standing. Upon dilution with water or neutralization with ammonium hydroxide, the byproduct can be separated into two layers. The upper layer comprises organic matter, possibly organic resins, and the lower or aqueous layer is acidic and contains the pyrophosphoric acid, the latter representing a major portion, about 80 percent, of the total product. This product contains about 98 percent phosphorous expressed as $H_3PO_4$ or 71 percent expressed as $P_2O_5$. Unless the phosphoric acid to be stabilized has a pH value of about 3 or greater, the pyrophosphoric acid-byproduct preferably should not be diluted with water until just prior to treatment or use, so as to minimize the reversion of pyrophosphoric acid to orthophosphoric acid. This limitation arises due to the finding that about a 50 percent or more dilution of the byproduct with water causes a gradual decrease in the effectiveness of the inhibiting material. However, if the byproduct is first neutralized to a pH value above about 3, and preferably above about 5, the effectiveness or stability of the pyrophosphoric acid-containing product can be maintained over a considerable period of time even when diluted with water. Where it is desired to neutralize crude phosphoric acid, the latter can be continuously mixed with the pyrophosphoric acid-containing byproduct, and the mixture subsequently neutralized with ammonia or the like. Alternatively, the pyrophosphoric acid-containing byproduct is first neutralized with ammonia so that the pH value is about 3 or greater, and the neutralized byproduct is then diluted with water as desired; the neutralized byproduct is then mixed with the crude phosphoric acid prior to or during neutralization of the crude acids. Alternatively, liquid ammonium phosphate solution, prepared in the usual manner, can be treated with the phosphoric acid-containing byproduct or the neutralized product thereof.

A further understanding of this invention can be gained from the following examples which illustrate various embodiments of this invention, but it should be understood that these examples are merely illustrative and do not necessarily limit this invention.

EXAMPLE I

Samples of white phosphoric acid (85% $P_2O_5$, reagent grade) and of crude phosphoric acid (44.5% $P_2O_5$), the latter containing iron and aluminum impurities expressed as oxides amounting to a total of about 2 percent by weight of the acid, were heated to a temperature of 255 to 260° C. This temperature range was reached in about 30 minutes and was maintained for 0, 60, or 120 minutes as indicated in Table I. After the heating period the resulting solutions of condensed acids were cooled to about 25° C. A portion of each solution was taken and mixed with samples of crude phosphoric acid. The volume of condensed acid solution used was sufficient to give an amount of condensed acid, expressed as $P_2O_5$, equal to 2.0 or 3.0 percent by weight in the resulting fertilizer solution.

The mixture of acids was then neutralized with ammonium hydroxide (28% NH₃) to form an 8-24-0 fertilizer solution. The ammonium hydroxide was run into a flask containing the mixture of phosphorous containing acids. The flask was placed in an ice bath and the rate of addition of the alkali was sufficiently slow (3 to 5 minutes) to keep the temperature below 70° C. The mixture was stirred during neutralization. The 8-24-0 fertilizer solutions had a pH between 6.5 and 7.2.

The results of these runs are summarized in Table I. These results show that essentially the same results are achieved with the condensed acids prepared from the white phosphoric acid and the crude phosphoric acid. Better results are obtained with condensed acids prepared by heating at 260° C. for 1 or 2 hours than with condensed acids which had merely been heated to 260° C. These runs also show that other 8-24-0 solutions having 2% of the $P_2O_5$ derived from the condensed acids solution gave good results, there being initially amount of precipitate or turbidity. With 3% of the $P_2O_5$ derived from the condensed acids which had been heated for 60 or 120 minutes the results were excellent, there being no visible turbidity and the solutions were clear.

*Table I*

RESULTS WHEN CONDENSED ACIDS PREPARED FROM CRUDE OR PURE ORTHOPHOSPHORIC ACID WERE USED TO PREPARE AN 8-24-0 LIQUID FERTILIZER

| Run No. | Condensed Acid | | | Appearance a of 8-24-0 fertilizer after | | |
|---|---|---|---|---|---|---|
| | Acid used | Time of heating at 260° C., minutes | Amt., Percent in 8-24-0 | Initial | 1 day | 4-5 days |
| 1 | (control test) | 0 | 0.0 | heavy ppt.b | heavy ppt.b | heavy ppt.b |
| 2 | white | 0 | 3.0 | gray ppt. | turbid | turbid. |
| 3 | do | 60 | 3.0 | clear | clear | clear. |
| 4 | do | 120 | 3.0 | do | do | Do. |
| 5 | crude | 0 | 3.0 | gray ppt. | turbid | turbid. |
| 6 | do | 60 | 3.0 | clear | clear | clear. |
| 7 | do | 120 | 2.0 | slightly turbid | do | Do. | a Initial observation made immediately after neutralization. The clear solutions were brown in color, but essentially free of visible turbidity or of sediment.
b Related quantitative tests showed the amount of sludge to be about 3 percent by weight of the fertilizer.

EXAMPLE II

Samples of 8-24-0 fertilizer solutions were prepared in a manner analogous to that stated for Example I except that the condensed phosphoric acids used were commercial products. These were: (1) pyrophosphoric acid, $H_4P_2O_7$, a solid commercial product described as 98 percent $H_4P_2O_7$; (2) a condensed metaphosphoric acid.

For these tests, the ammonium hydroxide and the acids were run into the flask simultaneously and mixed with a stirrer while maintaining a pH of about 6.8. The flask was contained in an ice bath, and the temperature of the mixture was maintained below 70° C. during the neutralization.

The results are given in Table II.

*Table II*

EFFECT OF PYROPHOSPHORIC AND A METAPHOSPHORIC ACID

| Acid used | Percent added | Appearance a of 8-24-0 liquid fertilizer solution after | | |
|---|---|---|---|---|
| | | Initial | 1 day | 10 days |
| pyrophosphoric | 1.0 | grey ppt | almost clear | turbid. |
| Do | 2.0 | clear | clear | clear. |
| Do | 2.5 | do | do | Do. |
| Do | 3.0 | do | do | Do. |
| Do | 3.5 | do | do | Do. |
| metaphosphoric | 3.0 | turbid | clear (at 3 days) | | a Initial observations made within 1 hour after preparing the solution. Clear solutions were a dark brown color but essentially free of turbidity.

EXAMPLE III

The 98 percent pyrophosphoric acid described in Example II was aded to crude phosphoric acid at ambient temperature (about 25° C.). Portions of the resulting solution of mixed acids were aged various lengths of time up to 3 days before neutralizing with ammonium hydroxide. The 8-24-0 fertilizer resulting from the neutralization of the acid solution was prepared by the method described in Example II. Of the total $P_2O_5$ in the fertilizer approximately 87 percent resulted from the $P_2O_5$ in the crude acid and 13 percent from the pyrophosphoric acid. It is understood, however, that the $P_2O_5$ added initially as pyrophosphate was, in part, converted to orthophosphoric acid during aging in the acid solution. Observations on the 8-24-0 fertilizer solutions are given in Table III and show that aging the condensed acid solution for 18 hours at room temperature nullified part of the beneficial effect.

*Table III*

| Time, hours | Temp., °C | Appearance a of 8-24-0 fertilizer after | |
|---|---|---|---|
| | | 0.25 hr. | 7 days |
| 2.5 | Room | Clear b | Clear. |
| 18 | do | Turbid with settled precipitate. | Turbid with settled precipitate. | a Clear solutions had a dark brown color.
b The solution was initially turbid but turned clear within 0.25 hour.

EXAMPLE IV

A condensed phosphoric acid was formed by the addition of phosphorous pentoxide ($P_2O_5$) to crude phosphoric plant acid containing 44.5 percent $P_2O_5$. For the test, 0, 2, or 3 g. of $P_2O_5$ were added to 54 g. of the crude acid. The acid solution was placed in a flask containing 11.2 g. of water and was then neutralized with 34.8 g. ammonium hydroxide (28% NH₃) to produce an 8-24-0, and 8-26-0, and an 8-27-0 fertilizer. The results are presented in Table IV.

*Table IV*

CONDENSED PHOSPHORIC ACIDS FORMED BY ADDITION OF $P_2O_5$ TO PLANT PHOSPHORIC ACID AND USED TO INHIBIT PRECIPITATION

| Percent $P_2O_5$ in fertilizer added as $P_2O_5$ | Total percent $P_2O_5$ in fertilizer | Appearance of fertilizer after | | |
|---|---|---|---|---|
| | | Initial | 1 day | 5 days |
| 0 | 24 | Heavy ppt | Heavy ppt | Heavy ppt. |
| 2 | 26 | Some grey ppt | Turbid | Turbid. |
| 3 | 28 | Clear | Clear | Clear. |

EXAMPLE V

A preparation of 8-24-0 liquid fertilizer was made by the simultaneous mixing of plant phosphoric acid containing pyrophosphoric acid and ammonium hydroxide. A clear brown solution was formed when 3 percent by weight of the $P_2O_5$ in the fertilizer was derived from the pyrophosphoric acid (98% $H_4P_2O_7$).

For this run, a solution containing 13.7 g. $H_4P_2O_7$ and 246 g. of crude orthophosphoric acid (44.5% $P_2O_5$) was run simultaneously with the ammonia into a flask containing 67 g. of water, with agitation, so as to maintain a pH of 6.5 to 6.8. The fertilizer solution thus prepared remained clear over a 7-day observation period.

EXAMPLE VI

Ammonium pyrophosphate was prepared from 98% pyrophosphoric acid by dissolving 15 g. of the acid in 5 g. of water and neutralizing the acid with anhydrous ammonia. As the ammonia neutralized the acid, the solution became hot and crystals separated out. Upon cooling in an ice bath, the mixture solidified. This mixture of ammonium salts of pyrophosphoric acid, was added to 250 g. of plant phosphoric acid (50.1% $P_2O_5$). The acid solution was neutralized with ammonium hydroxide (28% $NH_3$) to produce an 8–24–0 fertilizer. A small amount of precipitate formed initially, but within 30 minutes the 8–24–0 fertilizer was a clear solution. At the end of a seven-day, observation period, the fertilizer solution was still considered satisfactory for spray application, there being but a small amount of a colloidal-like precipitate.

EXAMPLE VII

Anhydrous phosphorous pentachloride (3 g.) was added to 48 g. of crude phosphoric acid (50.1% $P_2O_5$) which was diluted with 17.2 g. of water. The solution was neutralized, over a 3–5 minute period, by addition of 34.8 g. ammonium hydroxide (28% $NH_3$). The temperature of the mixture was maintained below about 70° C. The resulting 8–27–0 fertilizer solution contained no visible precipitate.

EXAMPLE VIII

Wet process phosphoric acid (48 parts by weight, 50.1% $P_2O_5$) was treated with 3 parts by weight of a pyrophosphoric acid-containing sludge byproduct. The mixture was neutralized with 34.8 parts by weight of ammonium hydroxide (28% $NH_3$) and diluted with water (17.2 parts by weight) to give an 8–24–0 fertilizer containing 3 percent by weight of the pyrophosphoric acid-containing sludge. The temperature was maintained below 70° C. during neutralization.

The resulting fertilizer solution had a brown-black color with no visible precipitate. Comparable fertilizer solutions prepared without the sludge contained a precipitate amounting to about 3 percent by weight of the fertilizer solution.

Another 8–24–0 fertilizer solution was prepared as described except only 2 percent by weight of the pyrophosphoric acid-containing sludge was added. The neutral solution was very slightly turbid immediately after neutralization. However, after a 10-minute aging period the solution became essentially clear and remained clear over a 3-day observation period.

EXAMPLE IX

A fertilizer solution was prepared using the ingredients listed below.

|  | Parts by weight |
| --- | --- |
| Crude $H_3PO_4$ (50.1% $P_2O_5$) | 40.9 |
| Pyrophosphoric acid-containing sludge | 7.1 |
| Ammonium hydroxide (28% $NH_3$) | 34.8 |
| Water | 17.2 |

The alkali and water were added to the stirred mixture of crude phosphoric acid and pyrophosphoric acid-containing sludge which was contained in a flask. The mixture was maintained at a temperature below 70° C.

The neutral fertilizer solution represents an 8–24–0 formulation wherein part of the $P_2O_5$ was derived from the sludge. The solution appeared clear, except for a small amount of material on the surface, and remained clear over an 18-day observation period.

EXAMPLE X

Water (92.0 parts by weight) was placed in a vessel equipped with a stirrer and containing electrodes to measure the pH. Ammonium hydroxide (28% $NH_3$) and crude phosphoric acid (50.1% $P_2O_5$) containing pyrophosphoric acid-containing sludge were added simultaneously while maintaining the pH at 6.8. The total alkali used was 174 parts, the crude phosphoric acid 219 parts, and the sludge 15 parts by weight. The resulting 8–24–0 fertilizer solution appeared clear and free of precipitates. At the end of a 6 day observation period the solution appeared clear except that a small amount of organic matter appeared on top of the solution. This surface layer is believed to represent material originating from the pyrophosphoric acid-containing sludge and could be removed by decantation or other simple means.

Various modifications and alterations of this invention will become apparent to those skilled in the art without departing from the scope and spirit of this invention, and it is to be understood that the latter is not necessarily limited by the foregoing discussion and illustrative examples.

We claim:

1. A method of treating wet process phosphoric acid and neutralized solutions thereof so as to inhibit the precipitation of solids of normally incident polyvalent cation impurities comprising iron and aluminum, which method comprises admixing one of said acid and solutions with an inorganic material which provides upon disassociation a condensed phosphate anion in an amount sufficient to substantially inhibit said precipitation.

2. A method of treating crude wet process phosphoric acid containing normally incident polyvalent cation impurities comprising iron and aluminum which tend to precipitate as solids both on standing and on neutralization thereof without an increase in the concentration of said impurities, which method comprises admixing said acid with an inorganic material selected from the group consisting of phosphorous pentoxide, phosphorous pentachloride, condensed phosphoric acids and ammonium salts and alkali metal salts of said condensed phosphoric acids, said material being used in an amount sufficient to substantially inhibit said precipitation.

3. The method according to claim 2 wherein said material is phosphorous pentoxide.

4. The method according to claim 2 wherein said material is a condensed phosphoric acid.

5. The method according to claim 2 wherein said material is an ammonium salt of a condensed phosphoric acid.

6. The method according to claim 2 wherein said material is an alkali metal salt of a condensed phosphoric acid.

7. The method according to claim 2 wherein said material is a metaphosphoric acid.

8. The method according to claim 2 wherein said material is a polyphosphoric acid.

9. The method according to claim 2 wherein said material is an ammonium salt of a metaphosphoric acid.

10. The method according to claim 2 wherein said material is an ammonium salt of a polyphosphoric acid.

11. The method according to claim 2 wherein said material is an alkali metal salt of a metaphosphoric acid.

12. The method according to claim 2 wherein said material is an alkali metal salt of a polyphosphoric acid.

13. The method according to claim 2 wherein said material is pyrophosphoric acid.

14. The method according to claim 2 wherein said material is tetrasodium pyrophosphate.

15. The method according to claim 2 wherein said material is ammonium pyrophosphate.

16. The method according to claim 2 wherein said material is phosphorous pentachloride.

17. A method of preparing a liquid fertilizer solution, comprising admixing crude wet process phosphoric acid with a precipitate-inhibiting inorganic material, said acid containing normally incident impurities, principally iron and aluminum polyvalent cations, which tend to precipitate as solids both on standing and upon neutralization of said acid without an increase in the concentration of said impurities, and then neutralizing the resulting admixture of said acid and said material, said material being selected from the group consisting of phosphorous pentachloride, phosphorous pentoxide, condensed phosphoric acid and ammonium salts and alkali metal salts of said condensed phosphoric acid, said material being admixed with said phosphoric acid in an amount sufficient to inhibit said precipitation and under conditions of temperature and pH so as to minimize the rate of reversion of the condensed phosphate anions produced upon disassociation of said material to the orthophosphate anion.

References Cited in the file of this patent

UNITED STATES PATENTS

| | | |
|---|---|---|
| 2,304,791 | Bell | Dec. 15, 1942 |
| 2,744,866 | Karhler | May 8, 1956 |
| 2,770,538 | Vierling | Nov. 13, 1956 |

OTHER REFERENCES

Industrial and Engineering Chemistry, Schwartz et al., Phosphates in Water Conditioning, vol. 34, No. 1, January 1942, pages 32–40.